Patented Sept. 19, 1944

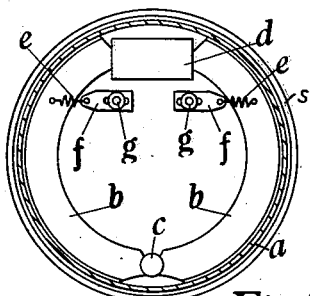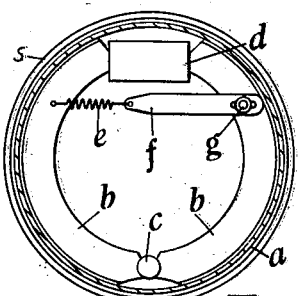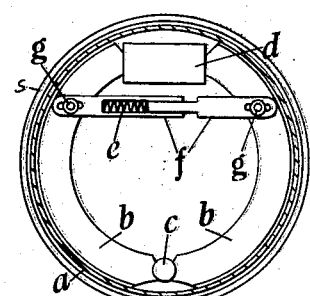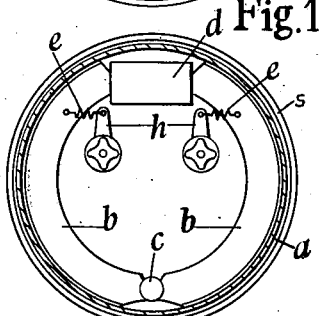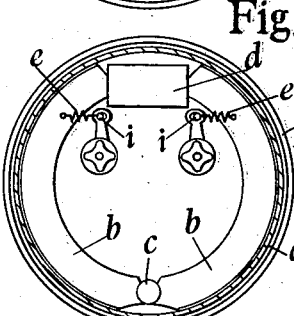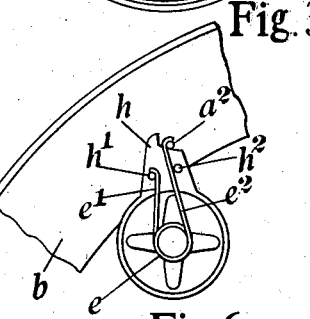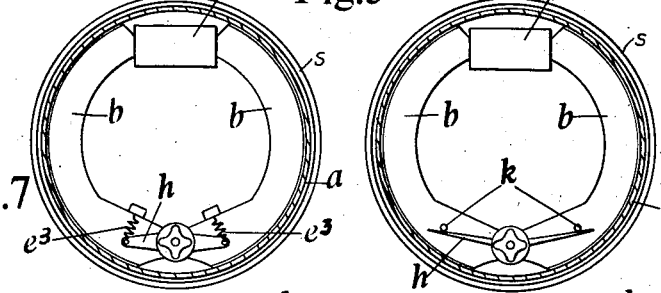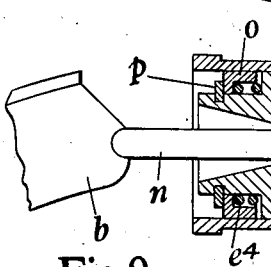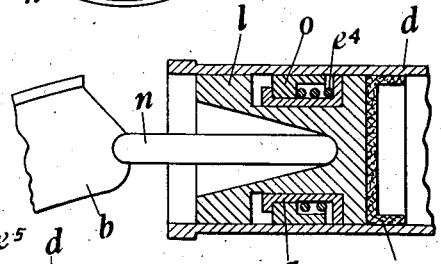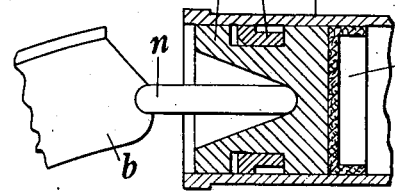

2,358,740

UNITED STATES PATENT OFFICE 2,358,740

HYDRAULIC VEHICLE BRAKE

Poul Arne Scott-Iversen, Chesford Grange, near Kenilworth, England, assignor to The Rover Company Limited, Chesford Grange, near Kenilworth, England Application December 20, 1941, Serial No. 423,850
In Great Britain January 29, 1941

5 Claims. (Cl. 188—79.5)

This invention relates to hydraulic vehicle brakes of the kind which depend for their action on the friction between the surfaces of relatively movable parts, such as for example a drum and shoes, and in which the said surfaces are in light contact when the brake is idle. One known form of such a brake comprises a rotary drum, a pair of segmental shoes in contact with the inner peripheral surface of the drum and pivotally mounted at one pair of adjacent ends on a stationary anchor plate, a hydraulic cylinder mounted on the plate between the other pair of shoe ends, and a pair of pistons located within the cylinder, together with means for transmitting pressure from each piston to the corresponding shoe, the liquid which applies the pressure being contained in the portion of the cylinder between the pistons. To prevent leakage of the liquid past the pistons, each is fitted with a packing in the form of a dished rubber, leather or like flexible member having its periphery in contact with the inner surface of the cylinder, and its dished side facing the liquid. When the brake is idle the contact pressure between the shoe and drum is light and the frictional resistance to rotation of the drum is negligibly small. On bringing the brake into action this pressure is increased to an extent dependent on the force applied by the driver to the brake pedal or other lever.

The problem which gives rise to the present invention has its genesis in the piston packings. Owing to the material from which they are made and also their configuration, they offer a greater frictional resistance to motion in the inward direction within the cylinder when the braking pressure is released than in the outward direction when the pressure is applied. In other words the pistons can move relatively to the cylinder in the outward direction more easily than in the inward direction. On applying the brake some outward movement of the pistons always occurs, and this is appreciable when a heavy braking force is exerted, on account mainly of the expansive yielding of the drum, and a corresponding return movement is imparted to the pistons when the braking force is released. This return movement is effected by the elastic restoration of the drum to its original form, and the force thus exerted is transmitted from the drum to the pistons through the friction faces of the drum and shoes. This force must be sufficient to overcome the frictional resistance of the piston packings and may be considerable. As a consequence the frictional resistance between the shoes and drum when the brake is released may be undesirably large, at least for a time. The object of the present invention is therefore to obviate this condition in a simple and satisfactory manner.

In the accompanying sheet of explanatory drawings:

Figure 1 is a front view illustrating diagrammatically a hydraulic vehicle brake embodying a form of the invention in which springs for overcoming the frictional resistance of the brake pistons, when the braking force is released, are associated with the brake shoes.

Figures 2 to 8 are similar views to Figure 1 illustrating alternative modes of arranging in association with the brake shoes a spring or springs for overcoming the frictional resistance of the brake pistons when the braking force is released.

Figures 9 and 10 are similar sectional views illustrating two different modes of arranging in association with the brake pistons, springs for overcoming the frictional resistance of these pistons when the braking force is released.

Figure 11 is a similar view to Figure 10 in which a rubber or like ring is employed instead of a spring.

Referring to Figure 1, the rotary brake drum of a vehicle brake is indicated by $a$. On an anchor plate $s$ there is mounted within the drum a pair of shoes $b$ having their operative surfaces in contact with the inner peripheral surface of the drum. One pair of ends of the shoes are supported on the said plate by a pivot $c$. Between the other ends of the shoes there is mounted on the plate the hydraulic cylinder $d$ which contains a pair of pistons, these being connected to the adjacent ends of the shoes by any convenient and ordinary operative means. For the purpose of elucidation it may be supposed that this cylinder contains shoe operating pistons similar to those illustrated in Figures 9 to 11 but without the springs $e'$ and associated parts.

In connection with each shoe is arranged a tension spring $e$. One end of this is attached to the shoe with which it is associated and the other end is attached to a link $f$ having a slot through which passes a screw $g$ by which it is secured to the anchor plate above mentioned. The grip exerted by the screw is a frictional one and is so adjusted that when in applying the brake a given tension on the spring is exceeded the link can slide to a new position relatively to the screw. The purpose of this frictional fixing is to enable the effect of wear of the shoes and drum to be compensated, and thereby allowing the required constant contact between shoes and drum to be maintained.

When the brake is put into action by fluid pressure in the cylinder some outward movement of the shoes occurs. This movement is usually small even when a large braking force is applied, and is due mainly to expansive distortion of the drum. In this movement each spring is correspondingly extended. On releasing the braking force the components of the brake mechanism resume their initial condition, the shoes remaining in contact with the drum, but the force required to return the pistons is provided by the springs associated with the shoes, and not by the elastic contraction of the drum acting through the shoes. Consequently the occurrence of an undesired excessive pressure between the drum and shoes due to the resistance of the piston packings after the braking force has been released is obviated.

I am, of course, aware that in the more usual form of vehicle brakes having in combination a drum, a pair of shoes arranged as shown in Figure 1 with a hydraulic cylinder between one pair of adjacent ends, it is the practice to employ a strong spring or springs for retracting the shoes after release of the brake applying force. In this case the shoes are moved clear of the inner peripheral surface of the drum into contact with a stop or stops by the spring or springs, and I desire it to be understood that my invention though it may appear to have a superficial resemblance to the known arrangement, is essentially different. With my invention I am concerned only with that type of brake in which the friction surfaces of the brake remain in light contact when the brake is idle, and the spring or each spring $e$ is practically unstrained when in its initial condition, and is only strained when the braking force is sufficient to produce elastic deformation of the drum, its sole function being to overcome the frictional resistance associated with the piston packing and so minimise the pressure that would otherwise exist between the drum and shoe or shoes when the brake is idle.

The essential features of the example of my invention shown in Figure 1 are capable of being embodied in a variety of different forms which are further exemplified in Figures 2 to 8.

Referring to Figure 2, the two brake shoes $b$ are interconnected by a spring $e$ and link $f$. The latter are interconnected at one pair of ends, and the other ends are connected to the shoes, the link being secured to its shoe by a screw $g$ which affords the required frictional fixing as above described.

In the example shown in Figure 3 a pair of links $f$ are each frictionally attached to the shoes $b$ by screws $g$, and the adjacent ends of the links are interconnected by a spring $e$ which can be tensioned by brake-applying movement of the shoes, one link being made in part in the form of a sheath for enclosing the spring and a portion of the other link.

In the example shown in Figure 4 I attach one end of a spring $e$ to each shoe $b$ and the other end to the outer end of a pivoted arm $h$ forming part of a frictional fixing mounted on the anchor plate of the brake. From its appearance this frictional fixing will readily be recognised as being similar in kind to the well-known friction shock absorbers used on motor vehicles. The end of the arm associated with its pivot is in the form of a circular plate, and between this portion and the anchor plate is arranged a disc of friction material, the parts being held in position under the required pressure by a star-shaped spring washer on the outer end of the pivot.

As already stated the purpose of the invention is to obviate excessive pressure between the shoes and drum when the brake is idle and after a brake applying force has been released. Up to this point in my description attention has been directed only to the frictional resistance associated with the piston packings, this being the main possible cause of excessive pressure when the brake is idle. An additional possible cause is that of contraction of the drum due to cooling, and in some cases it may be desirable to make an additional provision for neutralising this condition. An example is shown in Figure 5 which as regards its other features is similar to Figure 4. But instead of having a fixed connection between one end of each spring and the arm of the friction device, I arrange a small lost motion connection between the end of the spring and the arm. This is conveniently effected by attaching the spring $e$, to the arm by a pin $i$, which passes through a hole of rather greater diameter in the arm. Normally the pin under the spring tension is held in contact with one side of the hole. But should the drum contract due to cooling while the brake is idle, the shoes will be able to move with it, without increasing the pressure between them and the drum, by the movement of the pin across the hole in the arm. The normal condition will be restored when the temperature returns to that of normal running condition.

In the example shown in Figure 6, a friction device $h$ of the kind shown in Figure 4 or 5 is mounted on the anchor plate of the brake adjacent to any convenient part of each shoe $b$ and is connected thereto by a coiled wire spring $e$ one end $e^1$ of which abuts against a stop $h^1$ on the friction device and the other end $e^2$ of which abuts against a stop $a^2$ on the shoe. When contraction of the drum occurs it can press the shoes inwards independently of the spring and friction device, as the end $e^2$ of the spring is then restrained by a second stop $h^3$ on the friction device.

In the example shown in Figure 7 a single twin-armed friction device $h$ is mounted in combination with the pivot of the two shoes $b$ and the outer end of each arm is connected to the corresponding shoe by a compression spring $e^3$. These springs are arranged between anchorages on the arms and shoes so that the springs can be compressed by brake-applying movements of the shoes. If, due to wear of the brake shoes $b$ and drum $a$, the springs $e^3$ are compressed beyond a predetermined amount by the brake shoes, the arms of the friction device will take up a new position. When the brake-applying force is released the springs $e^3$ expand and by their action on the shoes $b$ provide the force required to return the pistons. Whilst the lost motion connection above described is not shown in this example it will be understood that it can be provided.

Still another example is shown in Figure 8. This is essentially similar to that shown in Figure 7 and differs in that each arm $h$ of the friction device is made in the form of a spring blade which serves to provide the force for returning the corresponding piston. The outer end of each arm lies in contact with one side of a stop or abutment $k$ on the corresponding shoe. In this arrangement the shoes can be moved inwardly by contraction of the drum without restraint by the arms.

All the examples above described are characterised by springs acting on the shoes. But the invention may be equally well applied to the pistons in the operating cylinder. Referring to Figure 9, there are here shown a portion of the cylinder $d$, a piston $l$ and rubber, leather or like dish-shaped packing $m$. Also there are shown a part of a brake shoe $b$ with a thrust-rod $n$ for interconnecting the piston and shoe. According to the invention we arrange around a reduced portion of the piston a friction ring $o$ which fits the cylinder closely and grips it with a sufficient tightness to form a stop. An abutment for the ring $o$ is provided in the form of a collar $p$ on the piston, and between the ring $o$ and a shoulder on the piston is arranged a spring $e^4$. Moreover a small amount of lost motion is provided between the said shoulder and the adjacent face of the ring. On applying the brake the piston compresses the spring and some or all of the lost motion may also be taken up causing the ring $o$ to be forced forward by the piston to a new position. On releasing the brake the force required to return the piston is exerted by the spring and the extent of return movement is limited by the interaction of the collar $p$ and ring $o$. In this example no provision is made to accommodate contraction of the brake drum due to cooling. To enable this latter requirement to be met I employ an arrangement as exemplified in Figure 10. Here the spring $e^4$ is carried as shown by a sleeve $q$ having a shoulder at each end, and the sleeve is so mounted on the piston that the latter is free to slide to a convenient extent relatively to the sleeve in the inward direction. Under normal conditions this arrangement operates in the same way as that shown in Figure 9, but in the event of contraction of the drum due to cooling the piston is free to slide relatively to the sleeve, the effect being similar to that described in connection with Figures 5 and 6.

Instead of using a metal spring with the piston, I may employ a spring in the form of a resilient rubber or like ring $e^5$ shaped as shown for example in Figure 11 and arranged in a groove in the piston. This ring is adapted to grip the cylinder and by reason of its shape it offers considerably greater resistance to motion in the outward direction than in the inward direction. In the outward motion of the piston the ring is compressed and thereby energised, and when the braking force is released, the ring in assuming its original shape pushes back the piston. This arrangement is equivalent in every way to the arrangement shown in Figure 10.

As regards the spring shown in Figures 9 and 10 it is not essential that this shall be substantially unstrained when in its initial condition as it is incapable of imparting to the piston in the inward direction movement in excess of that which it received during the outward movement of the piston, and the amount of this movement as already described corresponds to elastic deformation of the brake drum when the braking force is applied. In no arrangement according to my present invention is the spring capable of separating the shoes from the drum.

Having thus described my invention what I claim as new and desire to secure by Letters Patent is:

1. A hydraulic vehicle brake having in combination relatively rotatable friction members which are in constant light contact with each other when the brake is idle, and one of which is slightly deformable by increase of the contact pressure between the said members, fluid operable parts including at least one piston for bringing the brake into action by increasing the contact pressure between the said members, and resilient means arranged to overcome the frictional resistance of the piston when the braking force is released and thereby obviate the pressure that would otherwise oppose restoration of the deformable member to its initial form, the said resilient means having a frictionally yieldable anchorage to compensate the effect of wear of the friction members.

2. A hydraulic vehicle brake having in combination a rotary drum, at least one friction member which lies in constant light contact with the inner periphery of the drum when the brake is idle, the drum being slightly deformable by increase of the contact pressure between the said member and drum, fluid-operable parts including at least one piston for bringing the brake into action by increasing the contact pressure between the said member and drum, and resilient means arranged to overcome the frictional resistance of the piston when the braking force is released and thereby obviate the pressure that would otherwise oppose restoration of the drum to its initial form, the said resilient means having a frictionally yieldable anchorage to compensate the effect of wear of the said members, and also having a lost-motion connection for enabling the drum to contract without restraint by the said means.

3. A hydraulic vehicle brake as claimed in claim 1, in which the resilient means is formed by at least one spring arranged to act on at least one of the relatively rotatable friction members and having a frictionally yieldable anchorage to compensate the effect of wear of the said members.

4. A hydraulic vehicle brake as claimed in claim 1, in which the resilient means is incorporated with the piston.

5. A hydraulic vehicle brake as claimed in claim 1, in which the resilient means is incorporated and has a lost-motion connection with the piston.

POUL ARNE SCOTT-IVERSEN.